(12) United States Patent
Oroskar et al.

(10) Patent No.: US 8,965,374 B1
(45) Date of Patent: Feb. 24, 2015

(54) SYSTEMS AND METHODS FOR ADJUSTING MOBILE-STATION HARD-HANDOFF THRESHOLDS BASED ON CALL TYPE

(71) Applicant: Sprint Spectrum L.P., Overland Park, KS (US)

(72) Inventors: Siddharth S. Oroskar, Overland Park, KS (US); John W. Prock, Raymore, MO (US); Kurt M. Landuyt, Parkville, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 166 days.

(21) Appl. No.: 13/770,246

(22) Filed: Feb. 19, 2013

(51) Int. Cl.
*H04W 36/00* (2009.01)
*H04W 36/16* (2009.01)
*H04W 24/00* (2009.01)

(52) U.S. Cl.
CPC .............. *H04W 36/16* (2013.01); *H04W 24/00* (2013.01); *H04W 36/00* (2013.01)
USPC .......................... 455/436; 455/452.2; 455/442

(58) Field of Classification Search
None
See application file for complete search history.

(56) References Cited

U.S. PATENT DOCUMENTS

| 6,603,971 | B1 | 8/2003 | Mohebbi |
| 6,944,462 | B2 | 9/2005 | Riihinen et al. |
| 7,076,214 | B2 | 7/2006 | Jabbary |
| 8,254,331 | B2 | 8/2012 | Vargantwar et al. |
| 2002/0115427 | A1* | 8/2002 | Hayashi et al. ............... 455/410 |
| 2012/0063417 | A1 | 3/2012 | Redana et al. |

OTHER PUBLICATIONS

Palat, Sudeep and Godin, Philippe, Alcatel-Lucent Strategic White Paper, The LTE Network Architecture, A Comprehensive Tutorial, 2009.
Sesia, Stefania, Toufik, Issam, and Baker, Matthew, LTE—The UMTS Long Term Evolution, From Theory to Practice, John Wiley and Sons, Ltd., 2009.

* cited by examiner

*Primary Examiner* — Suhail Khan (57) ABSTRACT

A RAN includes a first coverage area and a second coverage. An access terminal, initially engaged in a call via the first coverage area, determines a call type of the call and adjusts, based on the determined call type, one or both of a first value for a first threshold and a second value for a second threshold. While engaged in the call, the access terminal determines that (i) a signal strength of a signal received from the first coverage area is less than the first threshold, and (ii) a signal strength of a signal detected from the second coverage area is greater than the second threshold. In response to making both determinations, the access terminal hands off the call from the first coverage area to the second coverage area.

20 Claims, 5 Drawing Sheets

SYSTEMS AND METHODS FOR ADJUSTING MOBILE-STATION HARD-HANDOFF THRESHOLDS BASED ON CALL TYPE

BACKGROUND

It is increasingly common for people to use client-side devices to communicate via a radio access network (RAN) with other devices, whether those devices are directly connected to the same RAN or to another network (such as another RAN or a transport network, as examples) to which that RAN directly or indirectly provides access. These client-side devices are generally referred to in this disclosure as access terminals, though this term is intended to broadly encompass various devices known by terms such as mobile stations, mobile devices, user equipment, wireless-communication devices, cellphones, smartphones, personal digital assistants (PDAs), tablets, laptops, air cards, Universal Serial Bus (USB) devices (e.g., dongles), and/or any other device(s) capable of functioning as an access terminal according to this disclosure. Via the RAN, access terminals generally engage in communications such as voice calls, packet-data sessions, text messaging (e.g., Short Message Service (SMS) messaging), and the like.

Furthermore, the wireless communication between the RAN and an access terminal is typically bidirectional in nature. The component of that communication that is sent from the RAN to the access terminal is described as being sent on what is known as the forward link, while the component that is sent from the access terminal to the RAN is described as being sent on what is known as the reverse link. On both links, the wireless communications are typically formatted in accordance with a wireless-communication protocol, one example type of which is code division multiple access (CDMA), where CDMA networks that operate according to industry specifications (IS) such as IS-95 and IS-2000 are often referred to as 1xRTT (or "1x") networks, where 1xRTT stands for Single Carrier Radio Transmission Technology.

Some RANs operate in accordance with a particular type of CDMA protocol known as Evolution Data Optimized (EV-DO). These RANs are generally configured to operate according to one or more versions of IS-856, and are designed to provide high-rate packet-data service to access terminals using a technique on the forward link known as time-division multiplexing (TDM) and using what is essentially 1x technology on the reverse link. More generally, RANs can be arranged to operate according to any of numerous other protocols, some examples of which are Long Term Evolution (LTE), Universal Mobile Telecommunications System (UMTS), WiMAX (IEEE 802.16), time division multiple access (TDMA), Global System for Mobile Communications (GSM), Wi-Fi (IEEE 802.11), and the like.

In RANs that are of a type known as wireless wide area networks (WWANs) (or cellular wireless networks), the entities with which access terminals communicate over the air interface are known by terms such as base station and access node, terms that are used at different times in different ways to refer to different entities. For example, the term base station is sometimes used to refer simply to a device also known as a base transceiver station (BTS), which contains the hardware, antennas, and other components that cooperate to actually conduct the over-the-air (OTA) communication with the access terminals on behalf of the RAN. In LTE networks, a BTS is typically referred to as an eNodeB, which stands for Evolved Node B, named as being an evolved version of a Node B in a UMTS Terrestrial RAN (or UTRAN). At times, however, the term base station or access node is used to refer in combination to (i) one or more BTSs and (ii) a device known as a base station controller (BSC) (or radio network controller (RNC)), which controls the BTS(s) and connects it (them) to the rest of the network and beyond.

Typically, the various base stations in a RAN are deployed in various locations in many different cities and other areas, with the aim of effectively blanketing such geographical areas with sufficient wireless coverage. As such, multiple wireless coverage areas (e.g., cells, sectors, and the like) in which a RAN provides wireless service are quite often adjacent to one another, and in fact quite often overlap, though perhaps only slightly.

OVERVIEW

Because coverage areas of a RAN generally overlap, access terminals will often be within more than one coverage area at any given time. Those coverage areas providing sufficient signal strength are maintained in the access terminal's "active set," and these coverage areas are designated to exchange call traffic with the access terminal when that access terminal is engaged in a call. A coverage area may be added to an active set as the access terminal moves into the coverage area and the coverage area's signal strength becomes sufficiently strong, while another coverage area may be removed as the access terminals leaves that coverage area and that coverage area's signal strength becomes sufficiently weak. "Hand off" (and, in particular, "soft handoff") is the process by which a coverage area is added to or removed from the active set.

An access terminal will typically conduct communication via a single carrier frequency at any given time. That is, the access terminal will typically use the same frequency for communication with all of the coverage areas. A "hard hand off" occurs when, for any of a variety of reasons, an access terminal switches from operating on one frequency to operating on a different frequency.

In some instances, hard hand off may be necessary (or at least readiness for a hard handoff may become necessary) when only one coverage area exists in the active set of an access terminal operating on a given frequency. In such an instance, the access terminal may monitor the signal strength of the one coverage area that remains in the active set on the given frequency. Upon the access terminal determining that the signal strength of the one coverage area is below a given threshold level ($T_{search}$), the access terminal may begin searching for (and monitoring the signal strengths of) other coverage areas (i.e., other frequencies) as potential handoff targets. The access terminal may then switch its operating frequency to that of a target coverage area upon the access terminal determining that the monitored signal strength of that coverage area exceeds a second threshold ($T_{switch}$).

RAN operators may desire to direct calls to respective coverage areas based on call type. For example, it may be preferable to direct data calls to coverage areas using higher-frequency band classes because, for example, higher-frequency communication may result in higher throughput. Additionally, it may be preferable to direct voice calls to coverage areas using lower-frequency band classes because, for example, lower-frequency communication typically allows for communication over greater distances (thus resulting in fewer dropped calls), and because most users are more sensitive to dropped voice calls than to dropped data calls. Disclosed herein are various embodiments for adjusting handoff thresholds based on call type. In one embodiment, an access terminal, engaged in a call in a communication system, determines a call type of the call and adjusts, based on the determined call type, one or both of a first value for a first threshold (e.g., $T_{search}$) and a second value for a second threshold ($T_{switch}$). The communication system may include a RAN having multiple coverage areas, including a first (e.g., source) coverage area and a second (e.g., target) coverage area, for providing wireless service to access terminals, and the access terminal may be initially engaged in the call via the first coverage area.

While engaged in the call, the access terminal may make a first determination and a second determination. The first determination could include a determination that the access terminal is receiving from the first coverage area a first signal having a signal strength that is less than the first threshold. The second determination may include a determination that the access terminal is detecting from the second coverage area a second signal having a signal strength that is greater than the second threshold. In response to making both the first determination and the second determination, the access terminals may hand off the call from the first coverage area to the second coverage area.

The call type may be classified using various criteria. One possibility is to classify call types by the protocol used for a call, e.g., 1xRTT vs. EV-DO vs. LTE. Call types could also be classified by the type of call traffic, such as voice vs. data. Further still, call types may be classified by a band class (e.g., 800 MHz vs. 1900 MHz) of the coverage area via which the access terminal is engaged in a call. And other classifications are possible as well.

By adjusting values for $T_{switch}$ and/or $T_{search}$ based on call type, the size of a coverage area can essentially be increased or decreased since an access terminal engaged in a call of a given type will hand off more or less readily as it moves towards the boundary of the coverage area. And by setting the size of the coverage area based on call type, calls can be directed to respective coverage areas based on the call type.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

I. Example Architecture

A. Example Communication System

Figure 1:
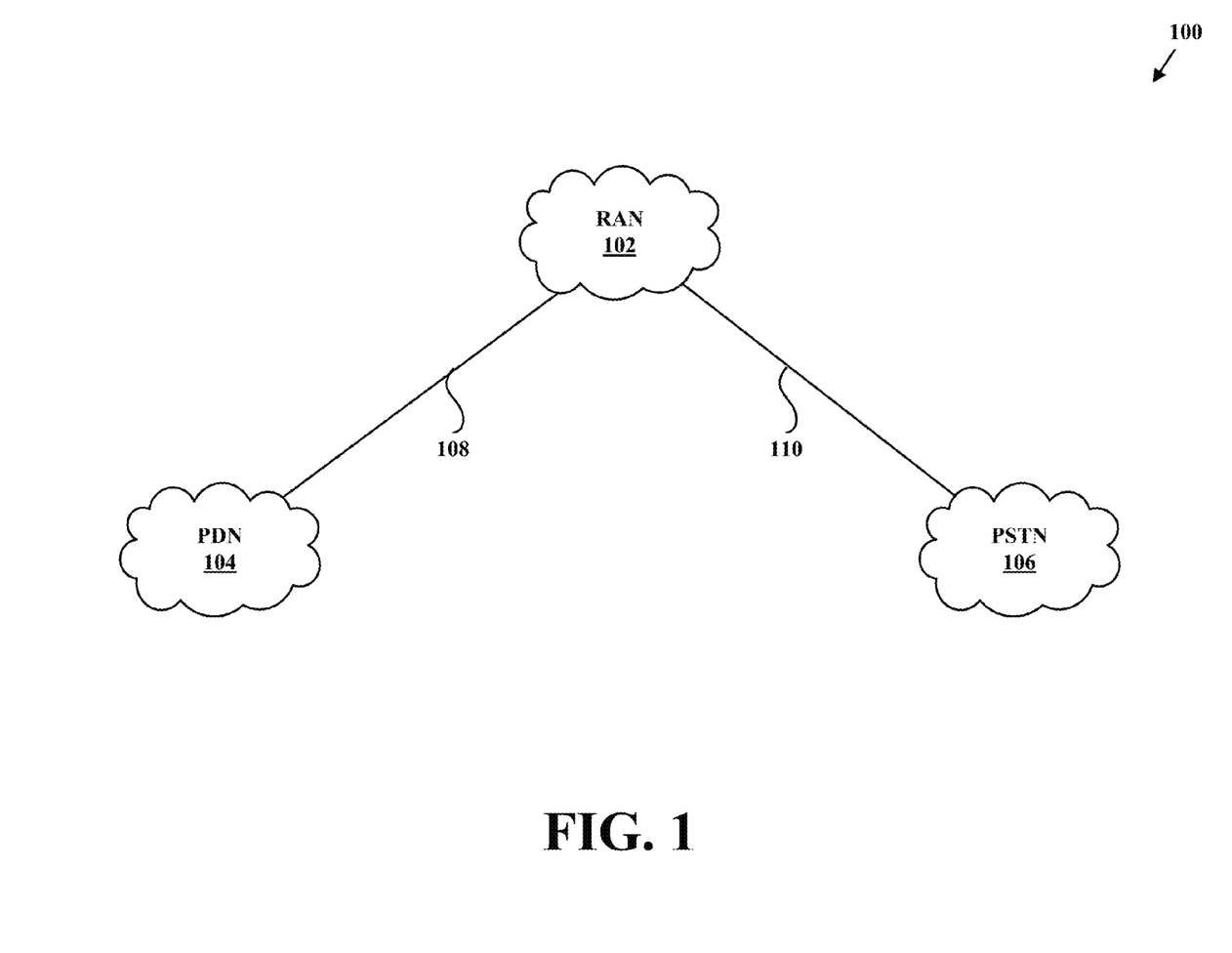
FIG. 1 depicts an example communication system.

Referring to the drawings, FIG. 1 depicts a communication system 100 that includes a RAN 102, a packet-data network (PDN) 104, and a public switched telephone network (PSTN) 106. RAN 102 communicates with PDN 104 via a communication link 108, and with PSTN 106 via a communication link 110; either or both of these communications links may include one or more wired and/or wireless interfaces.

B. Example Radio Access Network (RAN)

Figure 2:
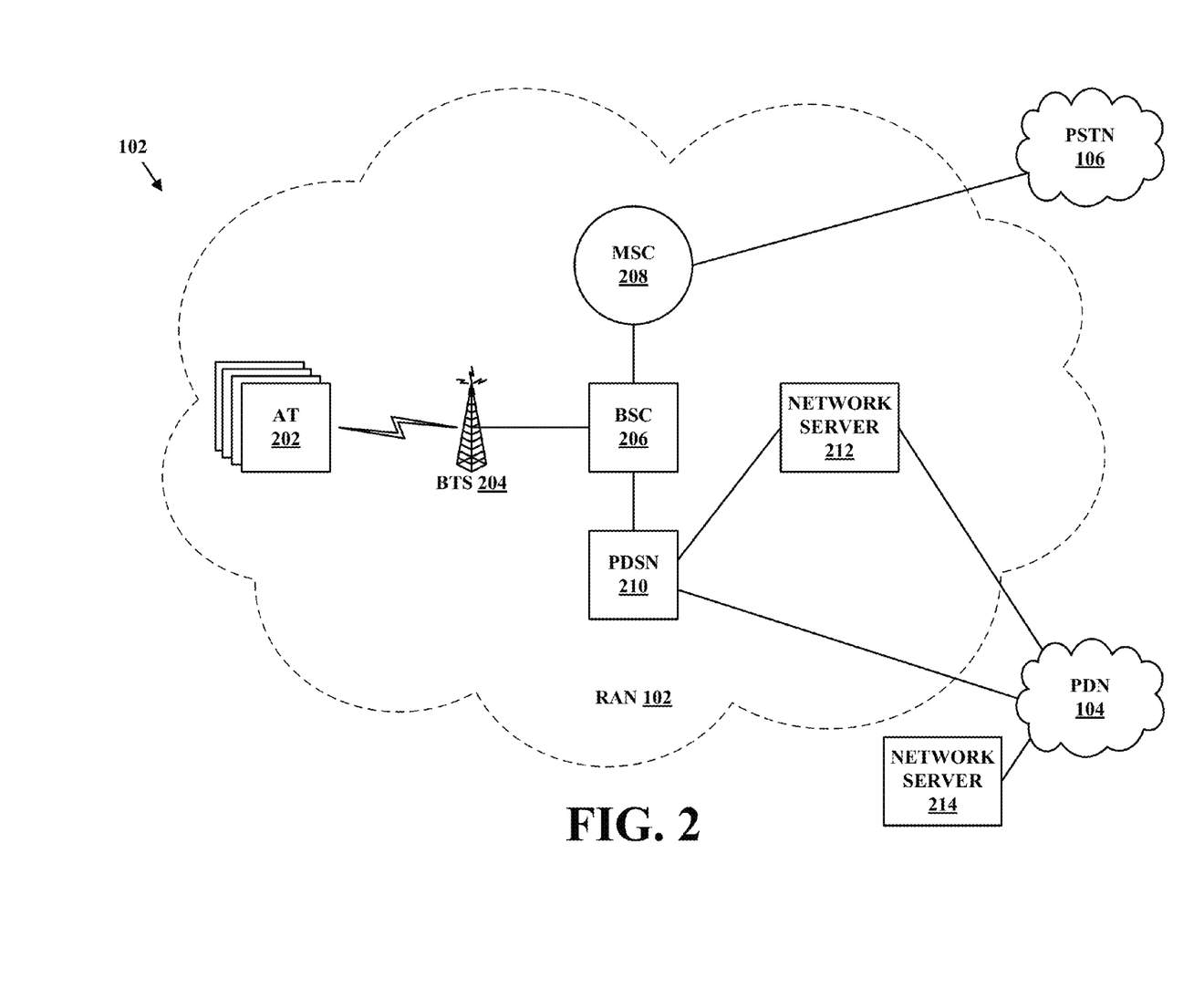
FIG. 2 depicts an example radio access network (RAN) in the context of the example communication system of FIG. 1.

FIG. 2 illustrates a more detailed RAN 102, which is shown in this example as including a plurality of access terminals (including access terminal 202), a BTS 204, a BSC 206, a mobile switching center (MSC) 208, a packet data serving node (PDSN) 210, and network servers 212 and 214. Additional entities could also be present, such as additional access terminals in communication with BTS 204, additional entities in communication with PDN 104 and/or PSTN 106, etc. Also, there could be one or more routers, switches, and/or other devices or networks making up at least part of one or more of the communication links. And other variations are possible as well.

An example access terminal is described below in connection with FIG. 3, while an example network entity is described below in connection with FIG. 4. The example access terminal could represent any one or more of the access terminals (such as access terminal 202), while the example network entity could represent BTS 204, BSC 206, MSC 208, PDSN 210, network server 212, network server 214, a coverage area, one or more other network servers, and/or one or more other devices and/or entities of any other type that are suitably arranged, programmed, and configured to, alone and/or in various combinations, carry out the functions described herein as being carried out by at least one network entity.

BTS 204 generally functions to provide one or more coverage areas on one or more carrier frequencies, and to interface between air-interface communications with access terminals on the one hand and "backhaul" communications with BSC 206 on the other hand. RAN 102 may include additional BTSs, and thus may provide multiple coverage areas. BSC 206 generally functions to control one or more BTSs, and to provide one or more BTSs with connections to devices such as MSC 208 and PDSN 210. MSC 208 generally functions to connect BSCs to circuit-switched networks such as PSTN 106, and serves at least a telephone-switch function to facilitate such connections.

PDSN 210 generally functions to connect BSCs to devices such as network server 212 and to packet-switched networks such as PDN 104, which could be the Internet; as such, PDSN 210 serves at least a network-access-server (NAS) function to facilitate such connections. One or both of network server 212 and network server 214 may, among other operations, carry out one or more of the functions described herein as being carried out by at least one network entity.

C. Example Access Terminal

Figure 3:
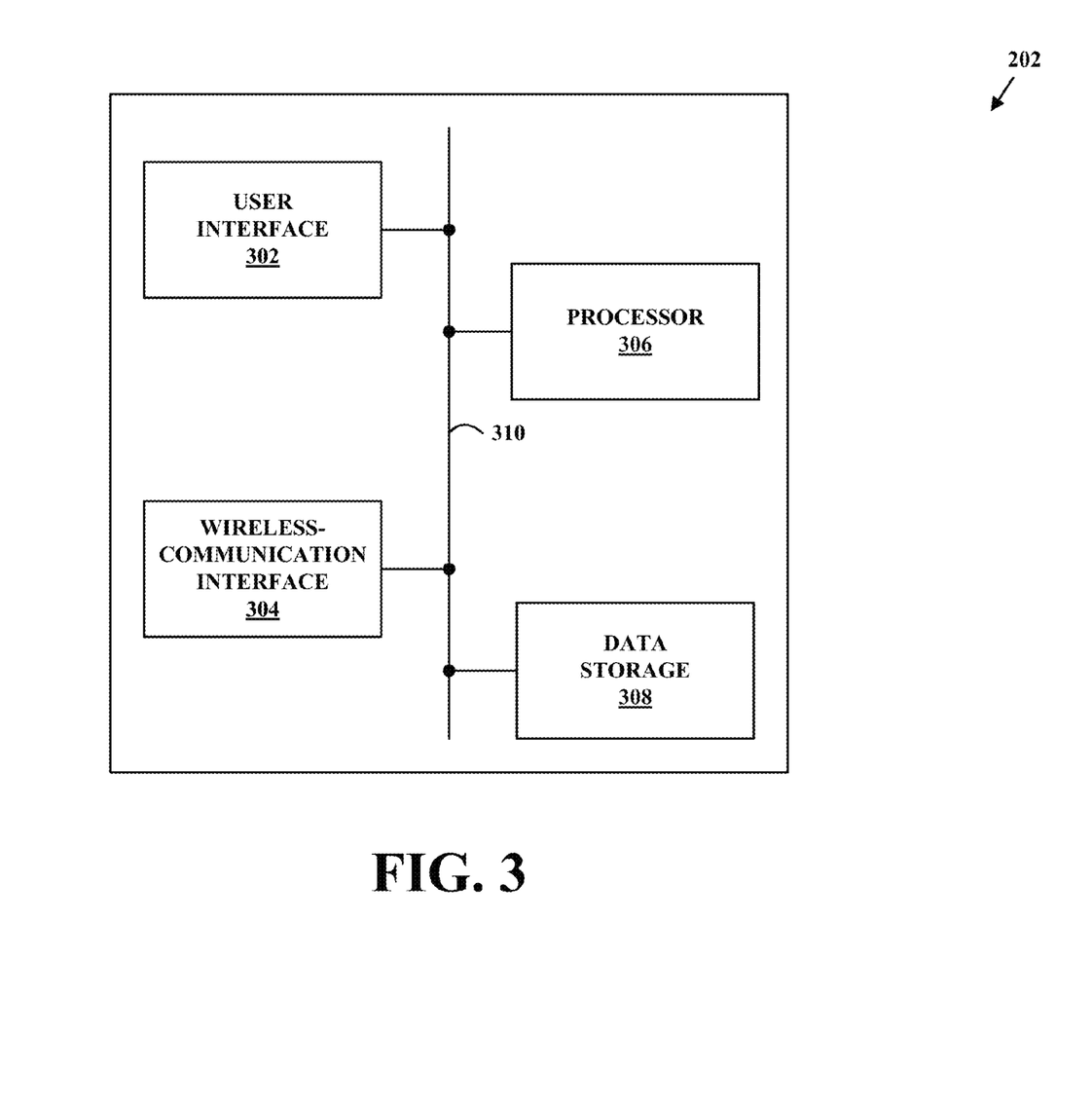
FIG. 3 depicts an example access terminal.

FIG. 3 is a block diagram of an access terminal. As shown, access terminal 202 includes a user interface 302, a wireless-communication interface 304, a processor 306, and data storage 308, all of which may be coupled together by a system bus, network, or other communication mechanism 310.

User interface 302 may include one or more input devices such as a touchscreen, one or more buttons, a microphone, and the like for receiving inputs from users, as well as one or more output devices such as a display, one or more indicator lights, a speaker, and the like for communicating outputs to users. Wireless-communication interface 304 may comprise one or more antennae and one or more chipsets for communicating with one or more base stations over respective air interfaces. As an example, one such chipset could be one that is suitable for CDMA communication. As another example, one such chipset could be one that is suitable for LTE communication. The chipset or wireless-communication interface in general may also or instead be arranged to communicate according to one or more other types (e.g., protocols) mentioned herein and/or any others now known or later developed.

Processor 306 may comprise one or more general-purpose processors and/or one or more special-purpose processors, and may be integrated in whole or in part with wireless-communication interface 304. Data storage 308 may comprise one or more volatile and/or non-volatile storage components (such as magnetic, optical, flash, or other non-transitory storage), and may be integrated in whole or in part with processor 306. And numerous other configurations are possible. Data storage 308 may contain program instructions executable by processor 306 for carrying out various access-terminal functions described herein.

D. Example Network Entity

Figure 4:
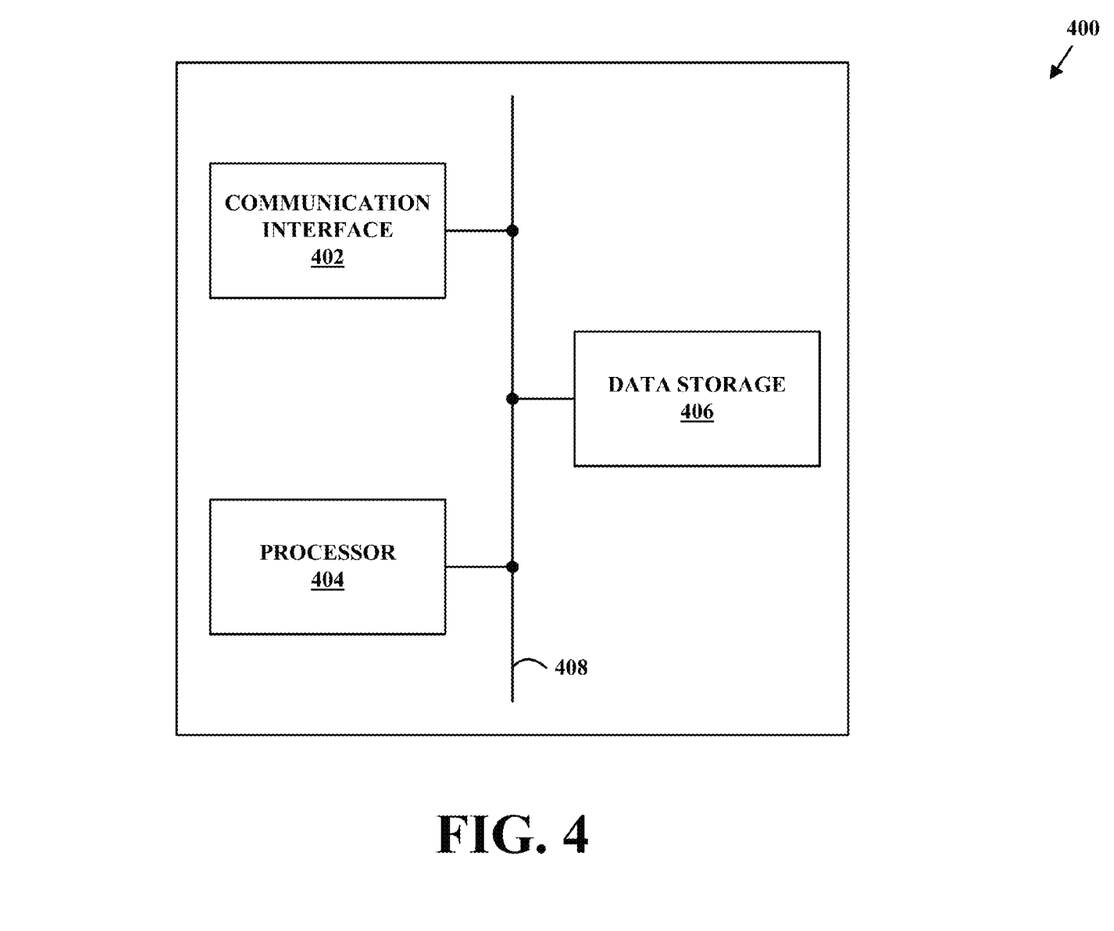
FIG. 4 depicts an example network entity.

FIG. 4 is a block diagram of a network entity, in accordance with one or more embodiments. As shown, network entity 400 includes a communication interface 402, a processor 404, and data storage 406, all of which may be coupled together by a system bus, network, or other communication mechanism 408. Communication interface 402 may include one or more interfaces (e.g., an Ethernet card) for engaging in wired communication and/or one or more interfaces (e.g., a Wi-Fi interface) for engaging in wireless communication.

Processor 404 may comprise one or more general-purpose processors and/or one or more special-purpose processors, and may be integrated in whole or in part with communication interface 402. Data storage 406 may comprise one or more volatile and/or non-volatile storage components (such as magnetic, optical, flash, or other non-transitory storage), and may be integrated in whole or in part with processor 404. Other configurations are possible without departing from the scope of the claims. Data storage 406 may contain program instructions executable by processor 404 for carrying out various network-entity functions described herein. Network entity 400 may also have a user interface and/or one or more other components deemed suitable for various contexts.

II. Example Operation

Figure 5:
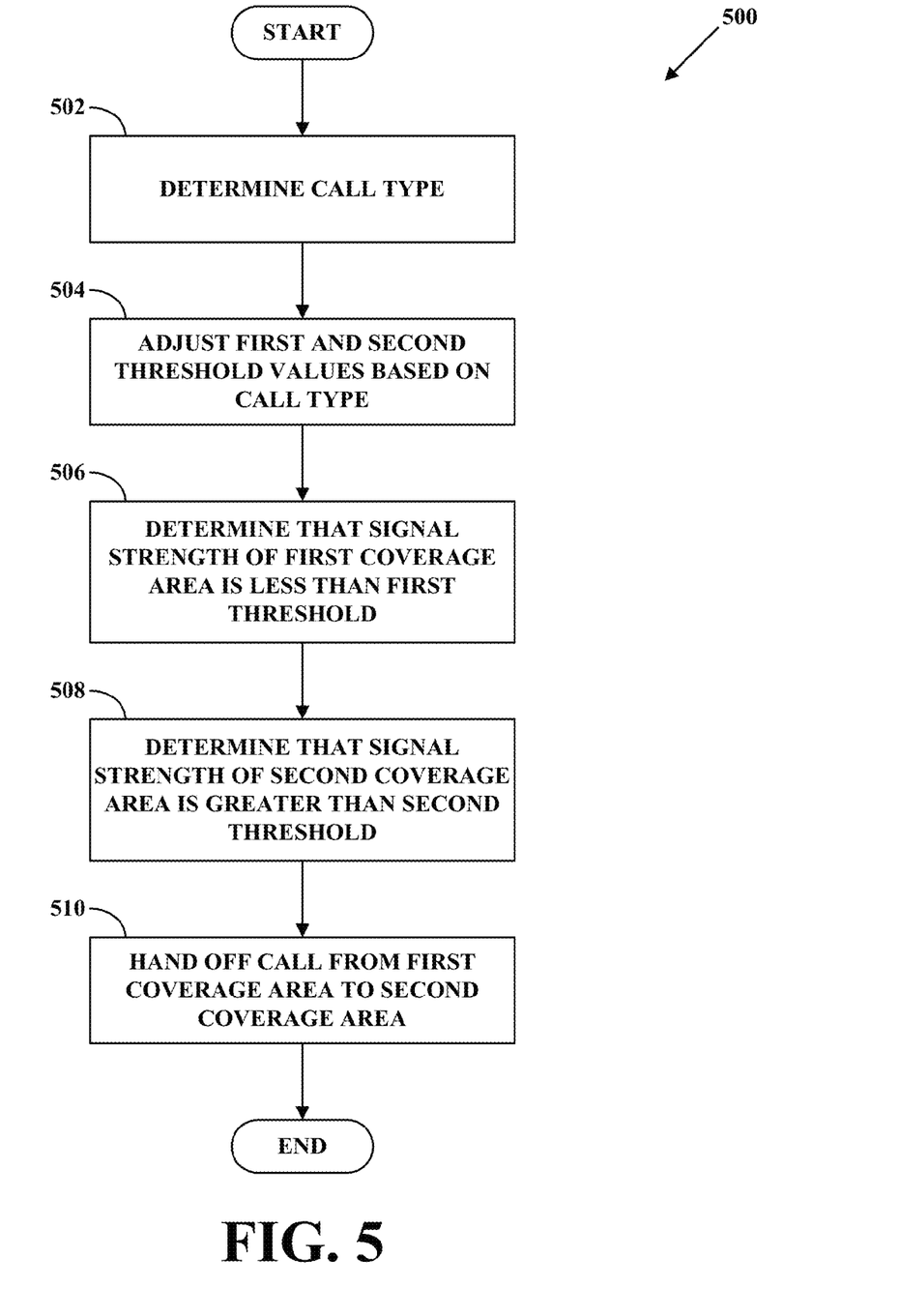
FIG. 5 depicts a flowchart of a method, in accordance with at least one embodiment.

FIG. 5 is a flowchart of a method, in accordance with one or more embodiments. The method may be carried out by, for example, access terminal 202 in communication system 100. Though the method is described below as being carried out by an access terminal, those having skill in the art will recognize that the method may be carried out by any other network entity, such as a BTS, a BSC, and/or any combination of these (including a coverage area), among numerous other examples.

As shown, method 500 begins at step 502 with access terminal 202, initially engaged in a call via a first coverage area of communication system 100, determining a call type of the call. The call type might be delineated by the protocol used for the call, such as 1xRTT, EV-DO, and/or LTE (as mentioned above), as well as UMTS, IEEE 802.16, TDMA, GSM, IEEE 802.11, or any combinations of these, among numerous other possibilities. The call type might alternatively be delineated by the type of call traffic, such as data or voice, as examples. Each call-traffic type could be further classified into subtypes, such as (for data calls) video data, text data, and/or SMS data, among numerous other possibilities. And, as described above, the call type could be delineated by the band class of the coverage area via which an access terminal is engaged in a call; numerous band classes in addition to BC1 (1900 MHz) and BC10 (800 MHz) could be used. The call could likewise be classified based on one or more individual frequencies via which a call is taking place. Those having skill in the art will understand that numerous other characteristics may be used to delineate types of calls, and that the call type could be expressed as a combination of protocol, traffic type, band class, and/or any other call type.

Method 500 continues at step 506 with access terminal 202 adjusting, based at least in part on the determined call type, one or both of a first value for a first threshold signal strength and a second value for a second threshold signal strength. One or more of the signal strengths could be expressed as energy per chip ($E_c$), a ratio of energy per chip to an interference and noise spectral density ($E_c/I_0$), or any combination of these, among numerous other possibilities.

Data storage 308 of access terminal 202 may store data, such as a table, identifying one or more call types and threshold values associated with the respective call types. Such a table could take the form of Table 1 below, which identifies two call types—a data call and a voice call—and stores both a first value and a second value for each of the call types.

TABLE 1

| Call Type | First Value | Second Value |
|---|---|---|
| Default | −60 dB | −55 dB |
| Data Call | −70 dB | −45 dB |
| Voice Call | −50 dB | −60 dB |

Alternatively, the first values and the second values could be stored in separate tables. Those having skill in the art will understand that other data structures and formats may be used to store the call type, the first value, and the second value.

One or both of the first and second values could be initially set to a respective default value. For example, Table 2 below (which may be stored in data storage 308) identifies a first value and second value that the access terminal may use in subsequent operations.

TABLE 2

| First Value | Second Value |
|---|---|
| −50 dB | −55 dB |

Accordingly, before the access terminal makes the first and second determinations at steps 506 and 508, respectively, the access terminal could adjust the values stored in Table 2, thereby affecting the first and second determinations.

The access terminal may adjust one or both of the first value and the second value based also on a current load level of one or both of the first and second coverage areas. Load in a coverage area may be measured and/or expressed as an amount of reverse noise, forward-link and/or reverse-link signal strength, forward-link and/or reverse-link signal-to-noise ratio (SINR), number of access terminals in the coverage area, number of traffic channels currently allocated in the coverage area, or any combination of these, among numerous other examples. As another possibility, the access terminal could adjust the values based also on information received in a candidate frequency search request message (CFSRM), which is described in additional detail below. Those having skill in the art will recognize that any suitable values for the first and second thresholds may be used, given that the appropriate and most-helpful value for a respective threshold may depend on various circumstances.

Method 500 continues at steps 506 and 508 with access terminal 202 making a first determination and a second determination, respectively, while engaged in the call. The first determination could include a determination that access terminal 202 is receiving, from the first coverage area, a first signal having a signal strength that is less than the first threshold. And the second determination could include a determination that access terminal 202 is detecting, from the second coverage area, a second signal having a signal strength that is greater than the second threshold. Access terminal 202 could make the first determination before, after, or concurrently with making the second determination.

The signal could be a pilot channel or a traffic channel, as examples. For example, the first signal could be a traffic channel via which the call is carried. The frequencies and/or the band classes may differ between the first and second signals. Those having skill in the art will recognize that other signals will fall within the scope of the claims as well.

Access terminal 202 may receive a CFSRM from a network entity (such as a first coverage area, a second coverage area, and/or RAN 102) before making the first determination and before making the second determination. The CFSRM could include an identification of one, two, or more coverage areas. Detecting the second signal could thus include the process of searching for a signal of one of the coverage areas identified in the CFSRM.

At step 510, and in response to making the first and second determinations in combination, access terminal 202 hands off the call from the first coverage area to the second coverage area. Handing off the call could include the access terminal receiving a handoff instruction from a network entity such as RAN 102, or could include the access terminal initiating the hand off, among other possibilities.

III. Conclusion

While some example embodiments have been described above, those of ordinary skill in the art will appreciate that numerous changes to the described embodiments could be made without departing from the scope and spirit of the claims.

What is claimed is:

1. In a communication system that comprises a radio access network (RAN) having multiple coverage areas for providing wireless service to access terminals, the multiple coverage areas including a first coverage area and a second coverage area, a method carried out by an access terminal that is initially engaged in a call via the first coverage area, the method comprising:
   determining a call type of the call and adjusting, based at least in part on the determined call type, one or both of a first value for a first threshold and a second value for a second threshold;
   making a first determination while engaged in the call, wherein making the first determination comprises making a determination that the access terminal is receiving from the first coverage area a first signal having a signal strength that is less than the first threshold;
   making a second determination while still engaged in the call, wherein making the second determination comprises making a determination that the access terminal is detecting from the second coverage area a second signal having a signal strength that is greater than the second threshold; and
   responsive to making the first and second determinations in combination, handing off the call from the first coverage area to the second coverage area.

2. The method of claim 1, wherein the first and second values are initially set to respective default values.

3. The method of claim 1, wherein at least one of the first and second signals is in an 800 MHz band class or a 1900 MHz band class.

4. The method of claim 1, wherein a band class of the first signal is different from a band class of the second signal.

5. The method of claim 1, wherein the call type comprises a 1xRTT call or an EV-DO call.

6. The method of claim 1, wherein the call type comprises a voice call or a data call.

7. The method of claim 1, further comprising receiving a candidate frequency search request message (CFSRM) from the RAN before making the first determination and before making the second determination.

8. The method of claim 7, wherein the CFSRM comprises an identification of a plurality of coverage areas, wherein detecting the second signal comprises searching for a signal of one of the plurality of coverage areas.

9. The method of claim 7, wherein adjusting one or both of the first and second values comprises adjusting the respective value based on information in the CFSRM.

10. The method of claim 1, wherein at least one of the first and second signals comprises a pilot channel.

11. The method of claim 1, wherein the access terminal makes the first determination before making the second determination.

12. The method of claim 1, wherein handing off the call comprises receiving a handoff instruction from the RAN.

13. The method of claim 1, wherein handing off the call comprises the access terminal initiating handing off the call.

14. The method of claim 1, further comprising selecting one or both of the first value and the second value based at least in part on one or both of a current level of load in the first coverage area and a current level of load in the second coverage area.

15. In a communication system that comprises a radio access network (RAN) having multiple coverage areas for providing wireless service to access terminals, the multiple coverage areas including a first coverage area and a second coverage area, an access terminal comprising:
   a communication interface through which the access terminal is initially engaged in a call via the first coverage area;
   a processor; and
   data storage containing instructions executable by the processor for carrying out a set of functions, the set of functions including:
      determining a call type of the call and adjusting, based at least in part on the determined call type, one or both of a first value for a first threshold and a second value for a second threshold;
      making a first determination while engaged in the call, wherein making the first determination comprises making a determination that the access terminal is receiving from the first coverage area a first signal having a signal strength that is less than the first threshold;

making a second determination while still engaged in the call, wherein making the second determination comprises making a determination that the access terminal is detecting from the second coverage area a second signal having a signal strength that is greater than the second threshold; and responsive to making the first and second determinations in combination, handing off the call from the first coverage area to the second coverage area.

16. The access terminal of claim 15, wherein at least one of the first and second signals is in an 800 MHz band class or a 1900 MHz band class.

17. The access terminal of claim 15, wherein a band class of the first signal is different from a band class of the second signal.

18. The access terminal of claim 15, wherein the call type comprises a 1xRTT call or an EV-DO call.

19. The access terminal of claim 15, wherein the call type comprises a voice call or a data call.

20. The access terminal of claim 15, further comprising receiving a candidate frequency search request message (CFSRM) from the RAN before making the first determination and before making the second determination.

* * * * *